United States Patent [19]

Wolf

[11] Patent Number: 5,158,176
[45] Date of Patent: Oct. 27, 1992

[54] PACKAGING FOR DATA - OR RECORDING MEDIUM, SUCH AS MAGNETIC TAPES OR COMPACT DISKS

[76] Inventor: Hans J. Wolf, Theodor-Schweitzer-Str. 1, 7137 Sternenfels, Fed. Rep. of Germany

[21] Appl. No.: 570,374

[22] Filed: Aug. 21, 1990

[30] Foreign Application Priority Data

Aug. 24, 1989 [DE] Fed. Rep. of Germany ....... 3927940

[51] Int. Cl.⁵ .................... B65D 85/57; B65D 85/575
[52] U.S. Cl. ............................. 206/45.13; 206/45.15; 206/307; 206/387
[58] Field of Search ............... 206/45.13, 45.15, 45.18, 206/307, 309–313, 387, 444; 220/335

[56] References Cited

U.S. PATENT DOCUMENTS

| | | | |
|---|---|---|---|
| 2,525,728 | 10/1950 | Sauer | 206/45.13 |
| 4,496,048 | 1/1985 | Sykes | 206/387 |
| 4,538,730 | 9/1985 | Wu | 206/309 |
| 4,732,269 | 3/1988 | Roy | 206/45.18 |
| 4,778,047 | 10/1988 | Lay | 206/311 |
| 4,863,025 | 9/1989 | Wolf | 206/387 |
| 4,867,302 | 9/1989 | Takahashi | 206/309 |

Primary Examiner—Jimmy G. Foster
Attorney, Agent, or Firm—Spensley Horn Jubas & Lubitz

[57] ABSTRACT

Packaging for data or recording media, for example for magnetic tape cassettes or compact disks, consists of snapped together lower and upper parts and a support frame, in the end areas of which spring elements are formed which press the lower part and upper part apart. The spring elements are formed in the shape of legs at the end of the support frame, which is in the shape of a crosspiece, into which a resilient clasp can be inserted, the end sections of which press on the insides of the lower part and upper part. Tongues formed on the crosspiece and connected with the legs assure the mechanic stability and torsion stiffness of the support frame along with the most economical use of the material and form receptacles for the secure holding and positioning of the recording medium.

19 Claims, 3 Drawing Sheets

PACKAGING FOR DATA - OR RECORDING MEDIUM, SUCH AS MAGNETIC TAPES OR COMPACT DISKS

BACKGROUND OF THE INVENTION

The invention relates to packaging for storing a data or recording medium, composed of a lower part and an upper part which can be snapped together, a support frame for receiving the medium, and resilient elements disposed for urging the upper and lower parts away from one another.

Such packaging is known from German Letters Patent DE-PS 3 736 239.

SUMMARY OF THE INVENTION

It is the object of the invention to improve the known packaging, in particular in view of the requirements of industrial mass production, in particular to minimize the technological effort regarding production and to assure the effectiveness and long-term dependability of the spring elements during the conventional lifetime of such packaging.

This object is attained in accordance with the invention in that the support frame includes a crosspiece which connects the hinge areas of the upper part and the lower part and which is, at least over a portion of its length, shaped for receiving a recording medium, and in that the spring elements are disposed at the end sections of the crosspiece.

In this way the spring elements form at the same time the borders at the ends of the support frame and define the position of the recording medium in the plane of the hinge axes, in particular if it has been provided in accordance with an improvement to dispose the spring elements essentially parallel to each other and vertically to the crosspiece. In this way an essentially U-shaped or fork-like shape is achieved, which is simple from the production technology point of view and can be made with the least amount of material; this effect is improved in accordance with a still further embodiment in accordance with which it is provided that the spring elements consist, in their area following the crosspiece, of a leg which is used simultaneously for receiving hinge parts, such as holes and/or pins for receiving the upper part and the lower part. The fork-like shape of such a support frame achieves a high degree of stability and torsion stiffness, along with the greatest economy in the use of materials.

Stability and torsion stiffness can also be increased if the shaping of the crosspiece in its longitudinal section consists of two tongues formed on it, which abut against the legs and, together with them, form a receiving chamber each, closed on four sides, at the two ends of the crosspiece for the recording medium.

The shape of the support frame in its end sections basically makes possible different embodiments of the spring elements, based on the legs at the end or the tongues following them.

In this case the resilient sections of the spring elements can be made of one piece with these components, but it is provided in accordance with a preferred embodiment of the invention that a resilient clasp is provided which can be inserted into the lateral leg and is supported there.

The desired resilient or snap properties of the packaging according to the invention can be assured and guaranteed over time by the appropriate selection of the material for this resilient clasp, for example an appropriately shaped wire of special steel.

Together with the hinge holes or hinge pins disposed at the bottom end of the two legs, these resilient clasps then exert a strong rotational force on the upper and lower parts for the generation of the desired flip-open movement, but only require minimal space and in particular do not interfere with the handling and the removal or insertion of the recording medium.

In accordance with further embodiments of the crosspieces at the end it is assured that the resilient clasp is practically completely received within the outer contours of the legs.

Housing the resilient clasps as an integral component of the leg furthermore results in a spring element which is completely divorced in respect to its shape and function from the recording medium contained, by means of which local stresses, particularly rotational forces from the ends of the resilient clasp which might possibly lead to damage, are kept completely away from the recording medium and are transferred exclusively to the edge areas of the upper part and lower part, i.e. to those locations where they have their greatest mechanical stability because of the doubled-back edge areas.

Further embodiments of the invention will be described below.

BRIEF DESCRIPTION OF THE DRAWING

A number of exemplary embodiments of the packaging according to the invention will now be described in detail by means of the drawings, shown are in.

DESCRIPTION OF THE PREFERRED EMBODIMENTS

In a known manner the packaging consists of an upper part 10 and a lower part 20 (cover and bottom), which enclose and protect in a known manner the recording medium (in the exemplary embodiment shown this is an audio cassette, judging by the size).

Figure 2:
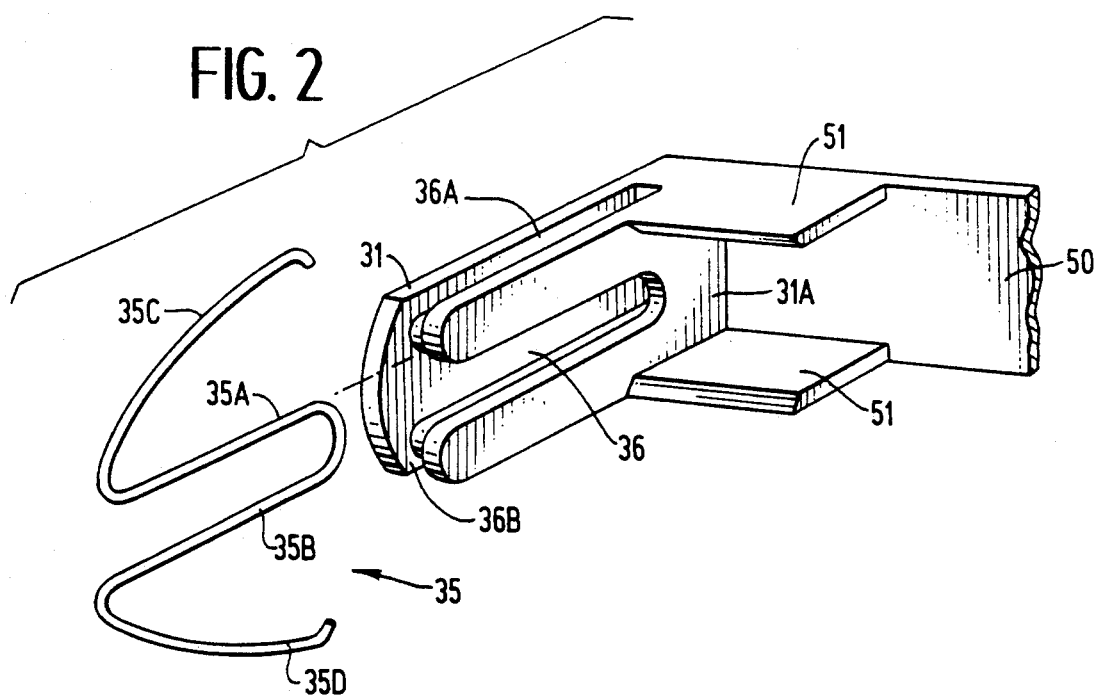
FIG. 2: a perspective view of the detail X of FIG. 1, FIG. 3: a second illustration of the detail X of FIG. 1 in the operational stage.

A crosspiece 50 is used as the "back portion" for connecting the upper part 10 and the lower part 20, at the end of which two spring elements 30, 40 are formed vertically to it and parallel to each other, so that a fork-like shape is formed. In the exemplary embodiment illustrated, a spring element 30, 40 has two components, namely a leg 31 (or 41, not shown in FIGS. 2 and 3) formed directly on the crosspiece 50, and a resilient clasp 35 or 45 insertable into this leg. In the bottom area of these spring elements are two holes 42, 43 each (or 32 and 33, not visible on the left side), into which corresponding pins 11, 12 of the upper part or 21, 22 of the lower part can be snapped in such a way, that then the crosspiece 50 closes the back of the packaging and the legs 31 or 41 rest against the inside of the edges of the upper part 10 and the lower part 20.

Each leg 31 or 41 (FIGS. 2, 3, first exemplary embodiment) have a central slit 36 which is of such a size that the two central legs 35A and 35B of the resilient clasp 35, which is in the shape of a letter W, can be inserted there with elastic deformation and accordingly are fixed in their end position by frictional engagement. In this position (FIG. 3) the two central legs 35A, 35B are completely received in the leg 31. By means of this the resilient clasp 35 not only is given solid mechanical support but also exact placement in respect to its point of engagement at the upper part 10 or lower part 20.

Figure 1:
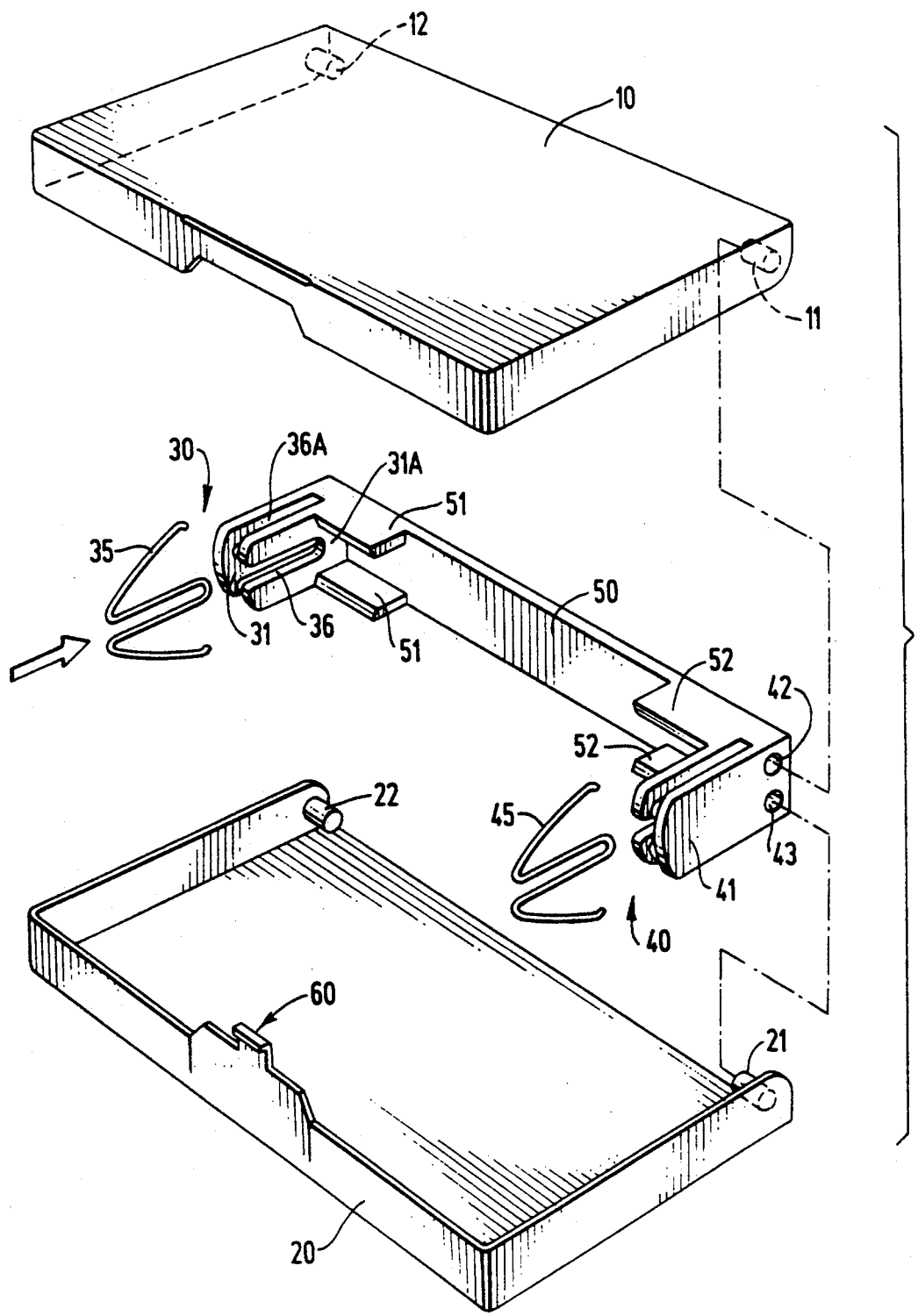
FIG. 1: an exploded view of the packaging with a first exemplary embodiment of spring elements.
Figure 3:
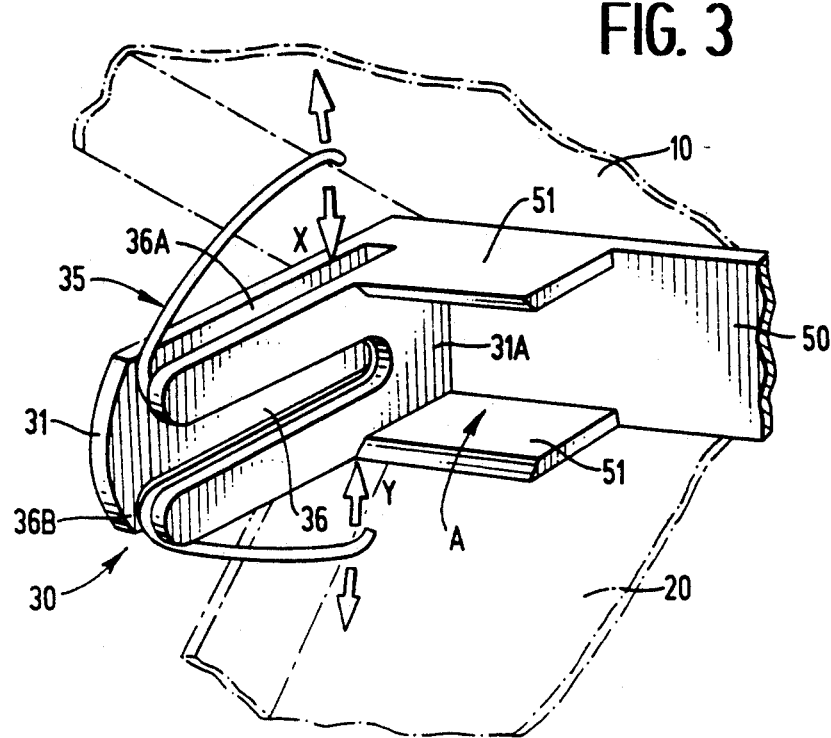

A first external slit 36A is cut on the top of the leg 31, a second external slit 36B on its bottom, which each are used for receiving one of the outer legs 35C or 35D of the resilient clasp. These two exterior slits 36A and 36B are of such size that their associated outer leg 35C or 35D can extend completely into the bar 31 when the packaging is closed, i.e. when the upper part 10 and the lower part 20 are pressed together against the force of the resilient clasp 35, as schematically illustrated in FIG. 3 by means of the two inward pointing arrows X and Y. To keep the upper and lower part locked, catch or snap elements are disposed on their outsides as a closure, for example the pressure closure 60 shown in FIG. 1 with a catch hook gripping an oppositely disposed mold in the upper part 10 from behind.

It can be seen particularly in FIG. 3 that the ends of the resilient clasp 35 are located relatively close to the pivot axes of the upper part 10 and the lower part 20, i.e. in an area which does not interfere with handling of the packaging, particularly the insertion and removal of the cassette, and in particular that there is no danger of injury.

This structural design of the end section of the crosspiece 50 in the form of a resilient element 30 (or 40) is additionally complemented by the formation of the tongues 51 or 52 which immediately follow on the inside 31A of the bar 31; by means of this the entire end section of the crosspiece 50, designed with economy of material, is stabilized on the one hand, on the other a receptacle A, enclosed on four sides, for the recording medium is created by the insides of the tongues 51, the crosspiece 50 and the interior wall 31A (correspondingly on the other side).

The crosspiece 50, legs 31 and 41 and tongues 51 and 52 can be advantageously made of one piece in the form of an injection-molded part.

Figure 4:
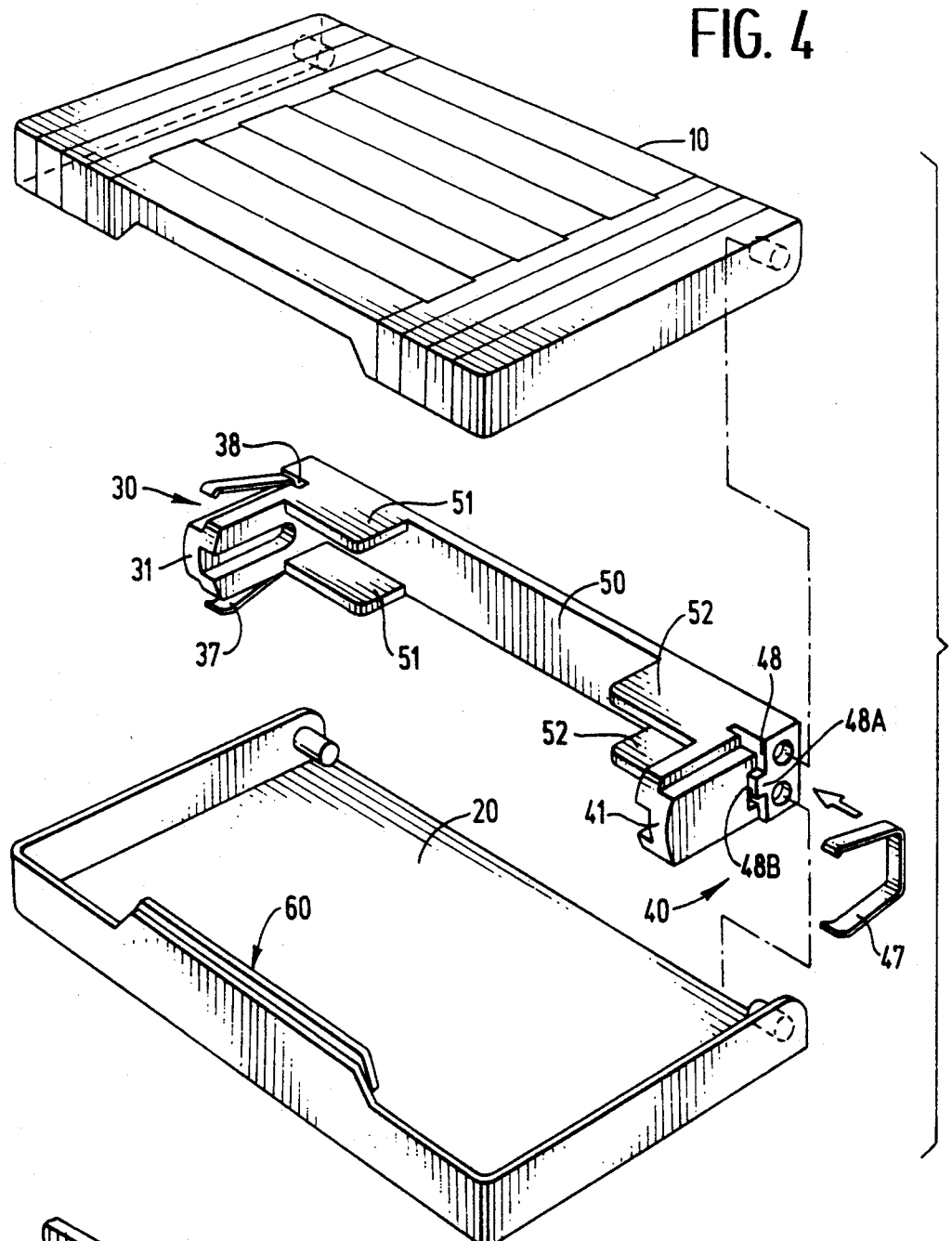
FIG. 4: an exploded view of the packaging with a second exemplary embodiment of the spring elements.

In the second exemplary embodiment of the spring elements 30, 40 (FIG. 4) a laterally accessible slit 38, 49 is cut in the legs 31, 41, the main direction of which lies in the plane of the crosspiece 50. On one inner side the slit 38, 48 has a toe 38A, 48A, opposite which a recess 38B, 48B is located. Toe and recess are of such a size that the slit can receive the center part of a U-shaped resilient clasp 37, 47 which during insertion (arrow) is elastically deformed in such a way, that holding of the resilient clasp 37, 48 secure against falling out is achieved. The two legs of the resilient clasp 37, 47 point away from the bar 50 and rest against the correspondingly formed upper or lower edges of the legs 31, 41 when the packaging is closed.

The two-piece embodiment of the resilient elements permits the removal of the resilient clasps in case the snap-open action of the packaging is not desired, as well as a simple replacement of resilient clasps; the packaging in accordance with the invention can therefore also be used as "normal" packaging, for example for audio cassettes, without snap-open action, or it is also possible to manufacture "normal" packaging by means of the parts in accordance with the invention in the course of large scale production line operations.

Figure 5:
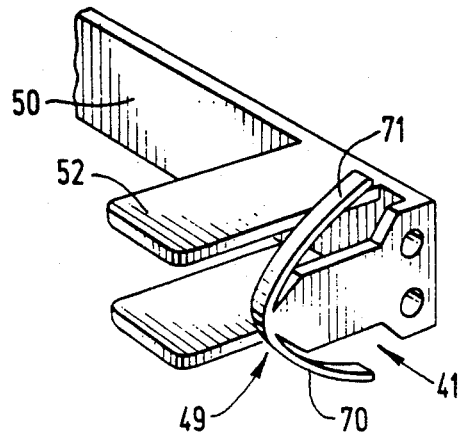
FIG. 5: a perspective partial view of the packaging with a third exemplary embodiment of the spring elements.

In the third exemplary embodiment (FIG. 5) the legs 31, 41 and the resilient element are in the form of a one-piece plastic part, the resilient elements being curved extensions 70, 71 which are supported at the outer end of the legs 31, 41, the ends of which are pressed against each other when closing the packaging.

I claim:

1. Packaging for storing a data or recording medium, comprising a lower part and an upper part which can be snapped together, a support frame for receiving the medium, and resilient elements disposed for urging said upper and lower parts away from one another, wherein:
   at least a portion of said support frame comprises a profiled crosspiece having two opposed ends and a length dimension which extends between the two opposed ends, said crosspiece further having two legs each disposed at a respective opposed end of said crosspiece and each extending perpendicularly to said length dimension;
   said upper and lower parts and said legs of said crosspiece have hinge means which pivotally connect each of said upper and lower parts to each of said legs for permitting pivotal movement of each of said upper and lower parts relative to said crosspiece about pivot axes parallel to said length dimension of said crosspiece;
   said legs form lateral stop faces for the medium; and
   each said resilient element is carried by a respective one of said legs and said resilient elements are oriented parallel to one another and extend perpendicularly to said length dimension of said crosspiece.

2. Packaging as defined in claim 1 wherein said legs enclose a region for retaining the medium and said resilient elements are located entirely outside of that region.

3. Packaging as defined in claim 2 wherein each said resilient element comprises a parabolic or arcuate shaped member which opens toward said crosspiece and is enclosed by one of said upper and lower parts.

4. Packaging as defined in claim 3 wherein each said leg has a central slit which receives a respective one of said resilient elements.

5. Packaging as defined in claim 4 wherein each said slit in each said leg has an open end for permitting insertion of the respective resilient element into said slit.

6. Packaging as defined in claim 5 wherein each said resilient element has two central members and two outer members arranged in the form of a W, said two central members being elastically deformable to be held in said slit of a respective leg, said two outer members being disposed to bear against respective ones of said upper and lower parts, and one of said two outer members constituting said parabolic or arcuate shaped member.

7. Packaging as defined in claim 6 wherein each said resilient element is made of metal.

8. Packaging as defined in claim 7 wherein each said resilient element is made of a steel wire.

9. Packaging as defined in claim 6 wherein: each leg has a top side which faces said upper part and a bottom side which faces said lower part; each leg is provided with an outer slit in said top side and an outer slit in said bottom side, each said outer slit extending parallel to said central slit; and each said outer slit is dimensioned for receiving at least part of a respective outer member of a respective resilient element when said upper and lower parts are snapped together.

10. Packaging as defined in claim 1 wherein: each said resilient element is a U-shaped piece having two portions which extend away from said crosspiece and which are enclosed by said upper and lower parts, respectively.

11. Packaging as defined in claim 10 wherein each said leg has an open slit which extends in a direction between said upper and lower parts for receiving and retaining a respective resilient element.

12. Packaging as defined in claim 11 wherein: each said resilient element has a base extending between and connecting said two portions of said resilient element; and each said leg further has a toe member positioned relative to said open slit for causing said base of a respective resilient element to be elastically deformed during insertion into said open slit and to then be securely held in said open slit.

13. Packaging as defined in claim 10 wherein: said crosspiece has a width dimension in a direction which extends perpendicularly to said length dimension and in the direction between said upper and lower parts; each said resilient element has a base extending between and connecting said two portions of said resilient element; said base of each said resilient element has a length which extends between said two portions in a direction parallel to said width dimension of said crosspiece, and which is substantially equal to said width dimension of said crosspiece; and said two portions of each said resilient element are configured such that when said upper and lower parts and snapped together, said two portions rest against a respective leg and extend parallel to one another.

14. Packaging as defined in claim 13 wherein each said resilient element is made of metal.

15. Packaging as defined in claim 14 wherein each said resilient element is constituted by a flat steel piece.

16. Packaging as defined in claim 1, wherein said crosspiece, including said two legs, is a one-piece injection molded plastic part 17. Packaging as defined in claim 1 wherein each said resilient element and the respective leg carrying said resilient element are together constituted by a one-piece injection molded plastic part.

18. Packaging as defined in claim 1 wherein said crosspiece further comprises at least one pair of parallel tongues which extend parallel to said length dimension and cooperate with said legs to receive the medium.

19. Packaging as defined in claim 18 wherein there are two pairs of said parallel tongues, and each pair of tongues abuts against a respective leg and forms with the respective leg and said crosspiece a receptacle which is closed on four sides for the recording medium at a respective end of said crosspiece.

* * * * *